US008653698B2

(12) United States Patent
Baarman et al.

(10) Patent No.: US 8,653,698 B2
(45) Date of Patent: Feb. 18, 2014

(54) INDUCTIVE POWER SUPPLY SYSTEM WITH MULTIPLE COIL PRIMARY

(71) Applicants: David W. Baarman, Fennville, MI (US); Scott A. Mollema, Rockford, MI (US); Joshua K. Schwannecke, Grand Rapids, MI (US)

(72) Inventors: David W. Baarman, Fennville, MI (US); Scott A. Mollema, Rockford, MI (US); Joshua K. Schwannecke, Grand Rapids, MI (US)

( * ) Notice: Subject to any disclaimer, the term of this patent is extended or adjusted under 35 U.S.C. 154(b) by 0 days.

(21) Appl. No.: 13/680,427

(22) Filed: Nov. 19, 2012

(65) Prior Publication Data

US 2013/0076154 A1    Mar. 28, 2013

Related U.S. Application Data

(63) Continuation of application No. 12/403,045, filed on Mar. 12, 2009, now Pat. No. 8,339,990.

(60) Provisional application No. 61/036,459, filed on Mar. 13, 2008.

(51) Int. Cl.
*H01F 27/29* (2006.01)
*H04B 5/00* (2006.01)

(52) U.S. Cl.
USPC ................... 307/104; 323/355; 455/41.1

(58) Field of Classification Search
USPC .......... 307/104; 323/355; 455/41.1; 355/41.1
See application file for complete search history.

(56) References Cited

U.S. PATENT DOCUMENTS

| 5,821,638 | A | 10/1998 | Boys et al. |
| 6,091,206 | A | 7/2000 | Siao |
| 6,100,663 | A | 8/2000 | Boys et al. |
| 6,184,651 | B1 | 2/2001 | Fernandez et al. |
| 6,321,067 | B1 * | 11/2001 | Suga et al. .................. 455/41.2 |
| 6,427,065 | B1 * | 7/2002 | Suga et al. .................. 455/41.1 |
| 6,459,218 | B2 | 10/2002 | Boys et al. |
| 6,515,878 | B1 | 2/2003 | Meins et al. |
| 6,803,744 | B1 | 10/2004 | Sabo |
| 6,825,620 | B2 | 11/2004 | Kuenen et al. |
| 6,844,702 | B2 | 1/2005 | Giannopoulos et al. |
| 7,076,206 | B2 | 7/2006 | Elferich et al. |
| 7,164,255 | B2 | 1/2007 | Hui |
| 7,212,414 | B2 | 5/2007 | Baarman |
| 7,218,534 | B2 | 5/2007 | Yasumura |

(Continued)

FOREIGN PATENT DOCUMENTS

| JP | 10-233235 | 9/1998 |
| JP | H11-188113 | 7/1999 |

(Continued)

OTHER PUBLICATIONS

USPTO Office Action dated Jul. 24, 2009 for U.S. Appl. No. 10/532,977.

(Continued)

*Primary Examiner* — Adi Amrany
(74) *Attorney, Agent, or Firm* — Warner Norcross & Judd LLP

(57) ABSTRACT

An inductive power supply including multiple tank circuits and a controller for selecting at least one of the tank circuits in order to wirelessly transfer power based on received power demand information. In addition, a magnet may be used to align multiple remote devices with the inductive power supply. In one embodiment, different communication systems are employed depending on which coil is being used to transfer wireless power.

21 Claims, 12 Drawing Sheets

(56) References Cited

U.S. PATENT DOCUMENTS

| | | |
|---|---|---|
| 7,233,137 B2 | 6/2007 | Nakamura et al. |
| 7,450,910 B2 | 11/2008 | Aoki |
| 7,522,878 B2 | 4/2009 | Baarman |
| 7,868,723 B2 | 1/2011 | Dobbs |
| 7,952,322 B2 | 5/2011 | Partovi et al. |
| 7,973,635 B2 | 7/2011 | Baarman et al. |
| 7,989,986 B2 | 8/2011 | Baarman et al. |
| 8,457,550 B2 * | 6/2013 | Goto et al. .................. 455/41.1 |
| 2002/0018025 A1 | 2/2002 | Matsuda et al. |
| 2002/0158512 A1 | 10/2002 | Mizutani et al. |
| 2004/0130913 A1 | 7/2004 | Giandalia et al. |
| 2004/0130915 A1 | 7/2004 | Baarman |
| 2004/0130916 A1 | 7/2004 | Baarman |
| 2005/0068019 A1 | 3/2005 | Nakamura et al. |
| 2007/0145830 A1 | 6/2007 | Lee et al. |
| 2007/0182367 A1 | 8/2007 | Partovi |
| 2008/0067874 A1 | 3/2008 | Tseng |
| 2008/0079392 A1 | 4/2008 | Baarman et al. |
| 2008/0265684 A1 | 10/2008 | Farkas |
| 2009/0102419 A1 | 4/2009 | Gwon et al. |
| 2009/0174263 A1 | 7/2009 | Baarman et al. |
| 2010/0073177 A1 | 3/2010 | Azancot et al. |
| 2010/0181841 A1 | 7/2010 | Azancot et al. |
| 2010/0190436 A1 | 7/2010 | Cook et al. |
| 2011/0127953 A1* | 6/2011 | Walley et al. ................. 320/108 |
| 2011/0217927 A1 | 9/2011 | Ben-Shalom et al. |

FOREIGN PATENT DOCUMENTS

| | | |
|---|---|---|
| JP | 2001-238372 | 8/2001 |
| WO | 2004/038888 | 5/2004 |
| WO | 2006001557 | 1/2006 |
| WO | 2008137996 | 11/2008 |
| WO | 2009045847 | 4/2009 |
| WO | 2010035256 | 4/2010 |
| WO | 2010093969 | 8/2010 |

OTHER PUBLICATIONS

International Search Report and Written Opinion of the International Searching Authority in the Counterpart PCT Application, dated May 14, 2009.

* cited by examiner

COIL SELECTOR CIRCUIT

INDUCTIVE POWER SUPPLY SYSTEM WITH MULTIPLE COIL PRIMARY

This application is a continuation of U.S. patent application Ser. No 12/403,045, filed Mar. 12, 2009, which claims the benefit of U.S. Provisional Application 61/036,459, filed Mar. 13, 2008.

BACKGROUND OF THE INVENTION

The present invention relates to inductive coupling and more particularly to systems and methods for providing multiple ranges of inductive power.

Systems for providing wireless power using the principles of electromagnetic inductive have been available for many years. Conventional systems have met with limited success as a result of practical limitations on pre-existing inductive technology. For example, to provide reasonably efficient operation, conventional inductive systems typically require close and precise alignment between the primary coil and the secondary coil, as well as a high degree of coordinated tuning between the electronics in the inductive power supply and the electronics in the remote device. These problems are complicated by the fact that different remote devices may require vastly different amounts of power. For example, a cell phone is likely to have different power requirements than a laptop or a kitchen appliance.

Some advances have been made that allow an inductive power supply to adjust and account for some differences between remote devices. U.S. Pat. No. 6,825,620 to Kuennen et al discloses an inductive power supply system that has the ability to adjust its operation to correspond with the operating parameters of various loads. U.S. Pat. No. 6,825,620 to Kuennen et al, which is entitled "Inductively Coupled Ballast Circuit" and was issued on Nov. 30, 2004, and is incorporated herein by reference. U.S. patent application Ser. No. 11/965,085 discloses an inductive power supply system that has the ability to identify the remote device and its operating parameters. U.S. patent application Ser. No. 11/965,085 to Baarman et al, which is entitled "Inductive Power Supply with Device Identification" and was filed on Dec. 27, 2007, and is incorporated herein by reference. Although these are marked improvements over pre-existing systems, there is, in some applications, a desire for even greater flexibility. In some applications, there exists a desire for a single inductive power supply that is capable of providing multiple ranges of power.

SUMMARY OF THE INVENTION

The present invention provides an inductive power supply system and associated method that identifies a power class of a remote device and provides inductive power as a function of that power class. In order to provide power as a function of power class, the inductive power supply includes a primary coil assembly with multiple coils. Each coil is capable of being selectively energized to produce a range of inductive power associated with a different power class. The inductive power supply system provides multiple ranges of power to remote devices without physical electrical contact.

In one embodiment, the present invention includes an inductive power supply having a controller, a coil selector circuit and a coil assembly. In this embodiment, the coil assembly includes a low power coil, a medium power coil and a high power coil. Each remote device is categorized as a low power class, medium power class or high power class device. The controller and coil selector circuit operate to energize a selected coil. In general, the low power coil is energized to power low power class devices, the medium power coil is energized to power medium class devices and the high power coil is energized to power high power class devices. In some applications, the low power coil may be used for authentication, identification or communication, even in medium power class and high power class devices. The inductive power supply may implement techniques for tuning the power provided by the selected coil. For example, each coil may be adaptive and capable of having its resonant frequency adjusted. Further, the operating frequency or other operating characteristics of the inductive power supply may vary.

In operation, the remote device communicates power demand information with the inductive power supply, such as the remote device power class. In one embodiment, the low power coil, when driven, produces a time varying magnetic field. When the secondary circuit is moved in proximity to the driven low power coil, the secondary circuit forms a mutual inductance with the low power coil. The low power coil's magnetic field passes through and energizes the secondary coil. This provides power to the secondary allowing a power class signal to be transmitted and authenticated starting the power control sequence at the appropriate range of power by selecting the appropriate coil.

One benefit of an inductive power supply having a coil assembly with multiple coils is that a single hot spot may deliver low, medium and high power to a remote device. This reduces the need to have an inductive power supply that powers low power devices, a separate inductive power supply to power medium power devices and a separate inductive power supply that power high power devices. Further, energy savings may result because higher power devices may use a lower power coil during lower power consumption periods. Additionally, lower power devices may draw power from a higher power coil in order to gain spatial freedom.

These and other objects, advantages, and features of the invention will be readily understood and appreciated by reference to the detailed description of the current embodiment and the drawings.

DESCRIPTION OF THE CURRENT EMBODIMENT

I. Overview

Figure 1:
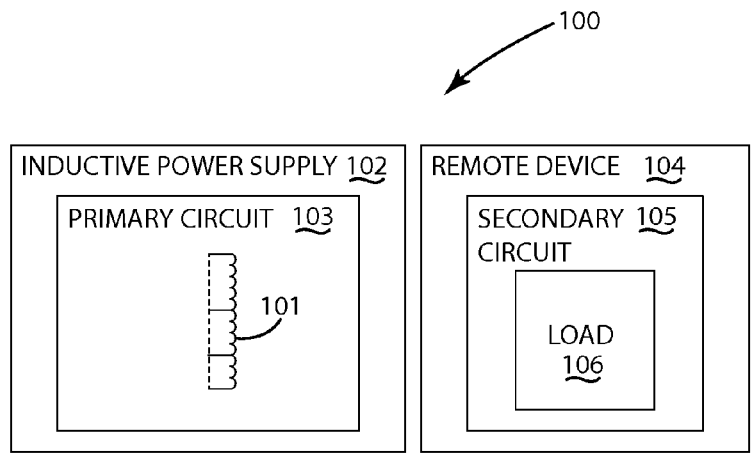
FIG. 1 is a block diagram of an inductive power supply system in accordance with an embodiment of the present invention.

In an exemplary embodiment of the inductive power supply system of the present invention depicted in FIG. 1 and designated 100, the inductive power supply system includes an inductive power supply 102 and a remote device 104. The inductive power supply includes a primary circuit 103 having a primary coil assembly 101 capable of generating multiple ranges of power. The remote device 104 includes a secondary circuit 105 having a load 106. The secondary circuit 105 of the remote device includes power demand information that may include a power class. The power demand information may be transmitted to the inductive power supply 102 in order to facilitate power transfer at an appropriate range of power. In response to the power demand information, the primary circuit 103 selects an appropriate coil of the primary coil assembly 101 over which to transfer power to the remote device 104. In one embodiment, the coil is selected at least in part as a function of the power class of the remote device. The ability to select different ranges of power with a single inductive power supply allows power transfer to devices with vastly different power demands.

The invention is described in the context of a coil assembly 101 with three coils that provide three different ranges of power that correspond respectively to three power classes. However, in some embodiments, the coil assembly may includes additional or fewer coils, thereby respectively increasing or decreasing the number of different ranges of power, and therefore number of power classes, that may be provided. That is, in the described embodiments, there is a one to one mapping between the number of ranges of power and the number of power classes. However, that need not be the case. In scenarios where there are more power classes than there are coils, multiple power classes may be mapped to the same coil. And vice versa when there are more coils than power classes. In some embodiments, there may be some overlap between power classes or the ranges of power provided b the different coils.

In some applications, devices may demand different amounts of power at different times. An example of this is demonstrated during a method of transferring power. The primary circuit 103 of the inductive power supply 102 periodically transmits power using a lower power coil. A remote device 104 that receives that power uses it to transmit power demand information to the inductive power supply 102. The inductive power supply uses the power demand information to select the appropriate coil of the coil assembly 101 for power transfer, which may be a different coil than the one used during the initialization procedure.

II. Inductive Power Supply System

Figure 5:
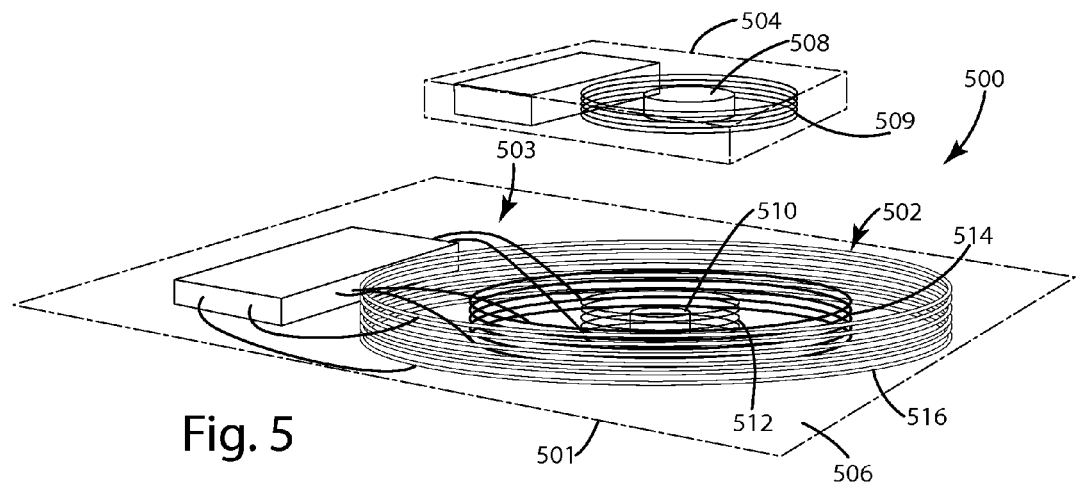
FIG. 5 is a schematic diagram of an inductive power supply system of one embodiment.

One embodiment of an inductive power supply system in accordance with the present invention is pictured in FIG. 5, and generally designated 500. The inductive power supply system 500 depicts an inductive power supply 503 and a remote device 504. Although depicted generically, the remote device 504 could be essentially any type of device that is capable of communicating, including allowing the inductive power supply to detect, power demand information, such as the power class of the remote device.

The inductive power supply 503 may be contained within a housing 501, such as a dedicated housing having a surface 506 on which to place the remote device 504. The size, shape and configuration of the housing 501 and surface 506 may vary. Further, the location of the primary coils 512, 514, 516 of the coil assembly 502 may also vary with respect to the surface 506 and with respect to each other. In the FIG. 5 embodiment, the coils 512, 514, 516 are arranged in a planar, concentric configuration under surface 506.

Figure 7:
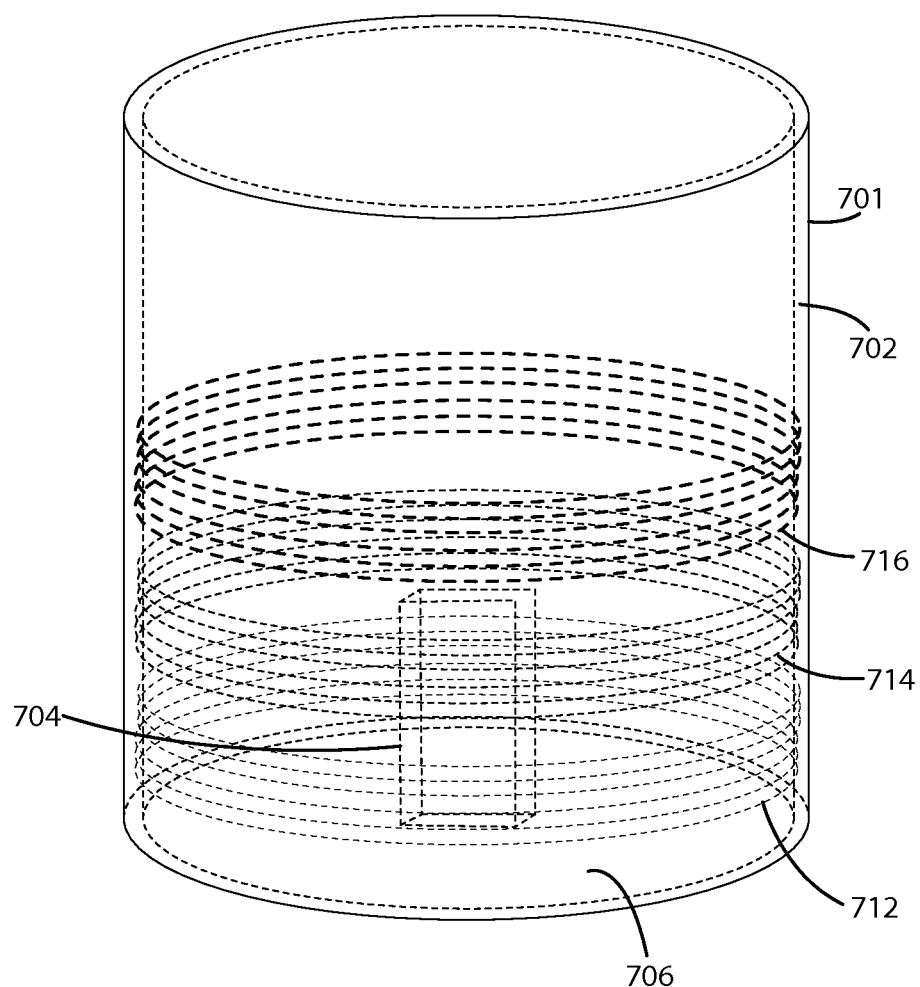
FIG. 7 is a schematic diagram of an inductive power supply system of one embodiment.

In alternative embodiments, such as the embodiment illustrated in FIG. 7, the coils 712, 714, 716 may be arranged in vertical alignment and embedded within the side wall 702 of a housing 701 that is shaped as a container with a surface 706 on which to place the remote device 704. FIGS. 5 and 7 are merely examples of how the housing, surface and coils may be arranged. Many other configurations are possible.

Similarities between the remote device secondary coil and the active primary coil promote efficient power transfer. For example, the secondary coil 509 and low power coil 512 are similar in size, shape, number of turns, length and gauge. These similarities make better alignment possible, which facilitates efficient power transfer. Similarly, medium and high power class devices may have a secondary with characteristics similar to the medium and high power coils respectively, which facilitates better power transfer when energizing those coils.

The size of the remote device or secondary coil may help align the remote device in the FIG. 7 embodiment as well. Although not true in every case, low power class devices tend to be physically smaller, while high power class devices tend to be physically larger in comparison. This means that where the coils are arranged vertically, as in the FIG. 7 embodiment, a smaller device has a tendency to align better with the low power coil 712 while a larger device has a tendency to align better with the high power coil 716.

Alignment of the remote device and active primary may be further facilitated by magnetic positioning. In some applications, the inductive power supply system 500 may incorporate a magnet 510 in the inductive power supply and a magnet 508 in the remote device to provide magnetic positioning. The inductive power supply system 500 may incorporate essentially any of the features from U.S. Provisional Patent Application 61/030,586 filed on Feb. 22, 2008 and titled "Magnetic Positioning for Inductive Coupling," which is herein incorporated by reference. The magnet may be for use with any combination of low, medium and high power class remote devices. Magnetic positioning may be used in some, all or no remote devices. The magnets are optional and need not be provided in the inductive power supply or remote device.

Figure 14:
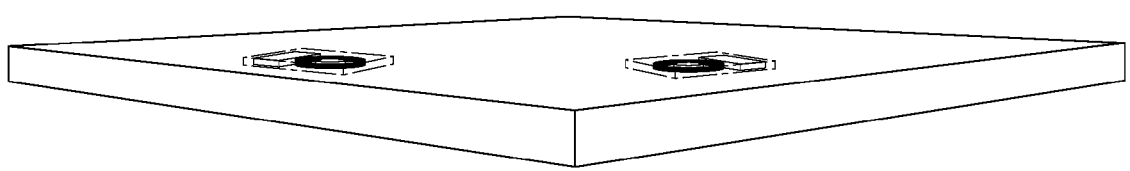
FIG. 14 is a schematic diagram of an inductive power supply system of one embodiment.

In some applications, multiple devices may be powered simultaneously by the inductive power supply, perhaps as best seen in FIG. 14. One simple scenario is where a higher power coil is used to power multiple lower power class devices. Because the higher power coil exhibits a larger inductive field that covers more area, there is more space for the devices to be positioned within. That is, because power efficiency does not substantially limit the amount of power a lower power device may receive during charging from a higher power coil, the lower power devices gain spatial freedom.

It should also be noted that more forgiving loads and devices may use a coil with a power class higher than the remote device power class in order to obtain benefits in spatial freedom. The devices are powered using a higher power coil, but at lower powers based on device classifications and other criteria. In the illustrated embodiment, such benefits may be obtained by using the medium power coil 514 or high power coil 516 with low power remote devices. One example of a forgiving load is a remote control. Typically, a forgiving load can be charged at different rates or with different amounts of power without its performance being substantially impaired.

Just as higher power coils can be used with lower power devices in some situations, so can lower power coils be used with higher power devices in some situations. Some higher power devices may have standby options that consume less power. In one embodiment, if a higher powered device indicates that it needs less power, because, for example, it is entering stand-by mode, then the lower power coil may be used to provide that power. Essentially, although a device may have a general power class, there may be situations where it is beneficial to provide more or less power, and those situations may be accommodated using a coil assembly with multiple coils. This also may result in energy savings.

III. Inductive Power Supply

The present invention is suitable for use with essentially any inductive power supply that includes a primary circuit 103 that has a primary coil assembly 101 with multiple coils. Accordingly, the circuitry unrelated to the primary coil assembly 101 in an inductive power supply 102 will not be described in detail. The primary circuit 103 may include essentially any circuitry capable of supplying alternating current at the desired frequency or frequencies. For example, the power supply circuit 103 may include the resonant seeking circuit of the inductive power supply system disclosed in U.S. Pat. No. 6,825,620, which is entitled "Inductively Coupled Ballast Circuit" and issued Nov. 30, 2004, to Kuennen et al; the adaptive inductive power supply of U.S. Pat. No. 7,212,414, which is entitled "Adaptive Inductive Power Supply" and issued May 1, 2007, to Baarman; the inductive power supply with communication of U.S. Ser. No. 10/689,148, which is entitled "Adaptive Inductive Power Supply with Communication" and filed on Oct. 20, 2003 to Baarman; the inductive power supply for wirelessly charging a LI-ION battery of U.S. Ser. No. 11/855,710, which is entitled "System and Method for Charging a Battery" and filed on Sep. 14, 2007 by Baarman; the inductive power supply with device identification of U.S. Ser. No. 11/965,085, which is entitled "Inductive Power Supply with Device Identification" and filed on Dec. 27, 2007 by Baarman et al; or the inductive power supply with duty cycle control of U.S. Ser. No. 61/019,411, which is entitled "Inductive Power Supply with Duty Cycle Control" and filed on Jan. 7, 2008 by Baarman—all of which are incorporated herein by reference in their entirety.

Figure 2:
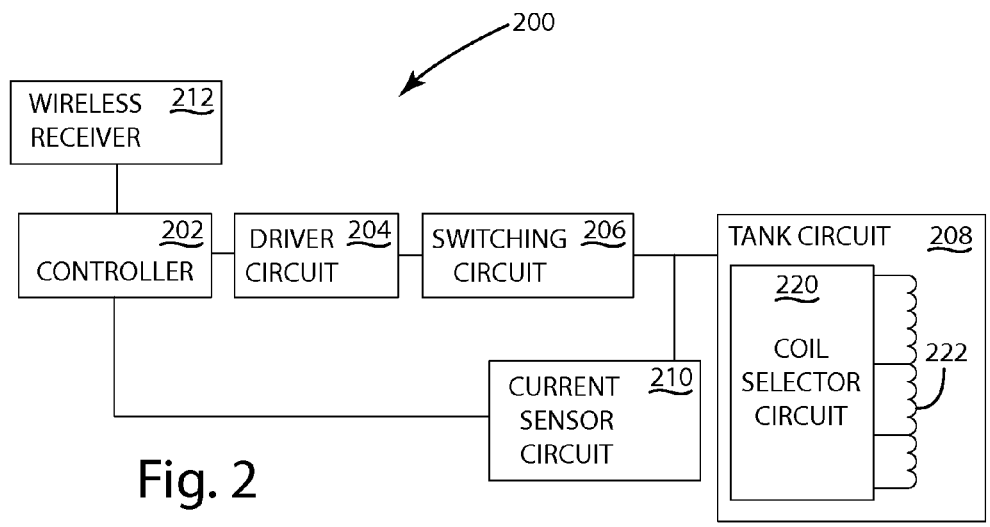
FIG. 2 is a block diagram of a primary circuit of one embodiment.

One embodiment of a primary circuit of an inductive power supply 102 is illustrated in FIG. 2, and generally designated 200. The primary circuit 200 of the illustrated embodiment generally includes a primary controller 202, a driver circuit 204, a switching circuit 206, a tank circuit 208, a wireless receiver 212 and a current sensor circuit 210.

Primary controller 202 controls the driver circuit 204, switching circuit 206 and tank circuit 208. The primary controller 202 is capable of processing information, such as power demand information, received from the remote device 104. The primary controller 202 may include internal memory, access external memory or a combination thereof. The power demand information may be used to determine which coil of the primary coil assembly 222 should be energized. In one embodiment, the power demand information provided by the remote device identifies whether the device is a low power class, medium power class or high power class. In an alternative embodiment, the power demand information provided by the remote device identifies an amount of power (or a power adjustment) the remote device would like to receive and the controller 202 processes that information to determine which coil to energize. If the power adjustment crosses a power class threshold, a different coil will be energized. In yet another alternative embodiment, the power demand information identifies the remote device and the primary controller uses a look-up table to determine which coil to energize.

In one embodiment, the power demand information includes information regarding minimum, maximum, or both power levels for specific coil selections. The thresholds used to determine which coil to energize may vary as a function of the power demand information. For example, for one remote device, the low power coil threshold minimum and maximum may be one value, but for a different remote device, the low power coil threshold minimum and maximum may be different values. There may be situations where for one remote device it is appropriate to use the low power coil to transmit a certain amount of power and for another remote device it is appropriate to use a medium power coil to transmit that same amount of power. The power demand information stored in the remote device may be based on capabilities and design expectations among other things.

The primary controller 202 may be programmed with additional features. For example, in one embodiment, the primary controller 202 is programmed to identify remote devices using the inventive principles described in U.S. Ser. No. 11/965,085, which was previously incorporated by reference. For example, the remote device ID may include power demand information. Alternatively, power demand information may be accessed using the remote device ID as a key to a look up table on the inductive power supply 102.

Essentially any type of driver 204 and switching circuit 206 may be used. The switching circuit 206 in the current embodiment is implemented as a pair of switches that form an inverter that converts DC to AC.

Figure 4:
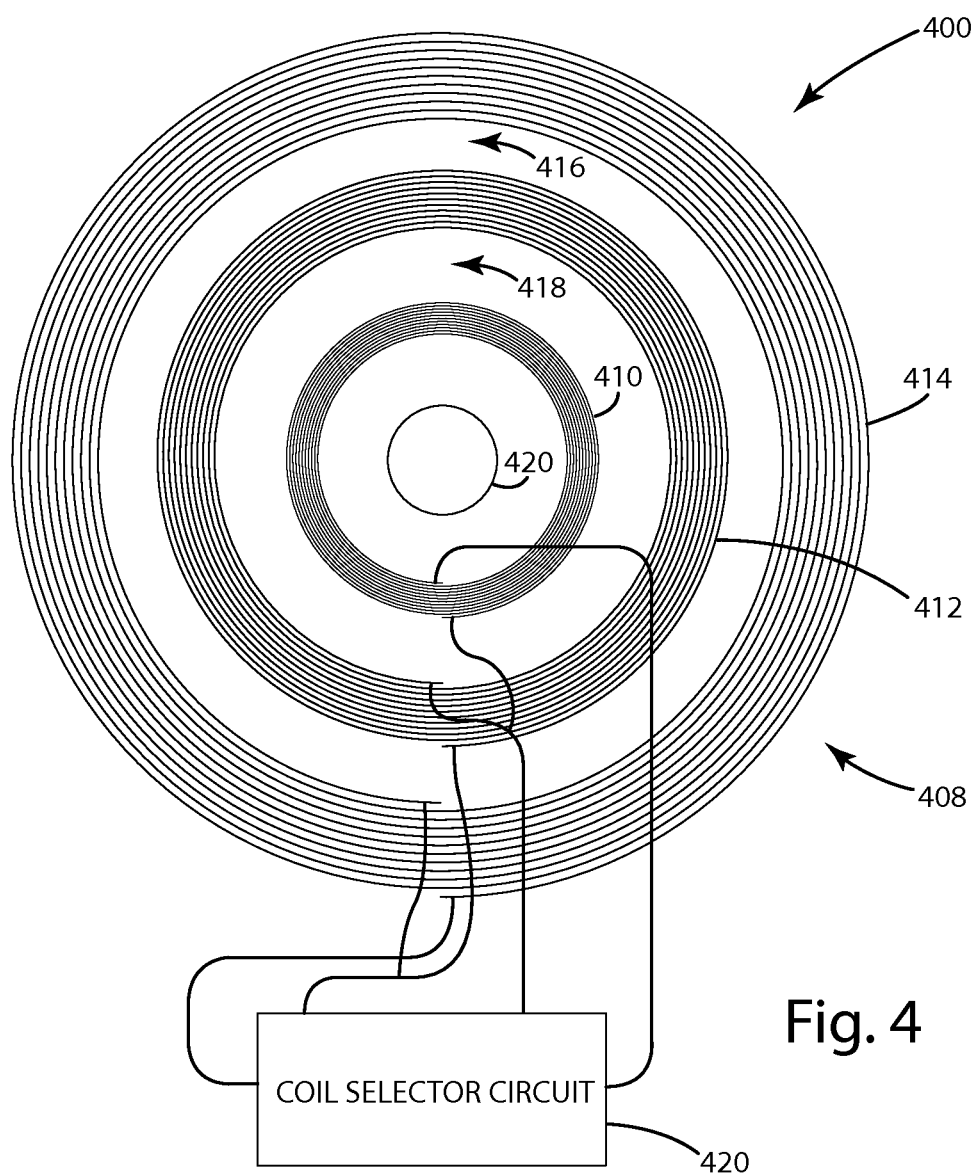
FIG. 4 is a schematic diagram of a tank circuit of one embodiment.
Figure 6:
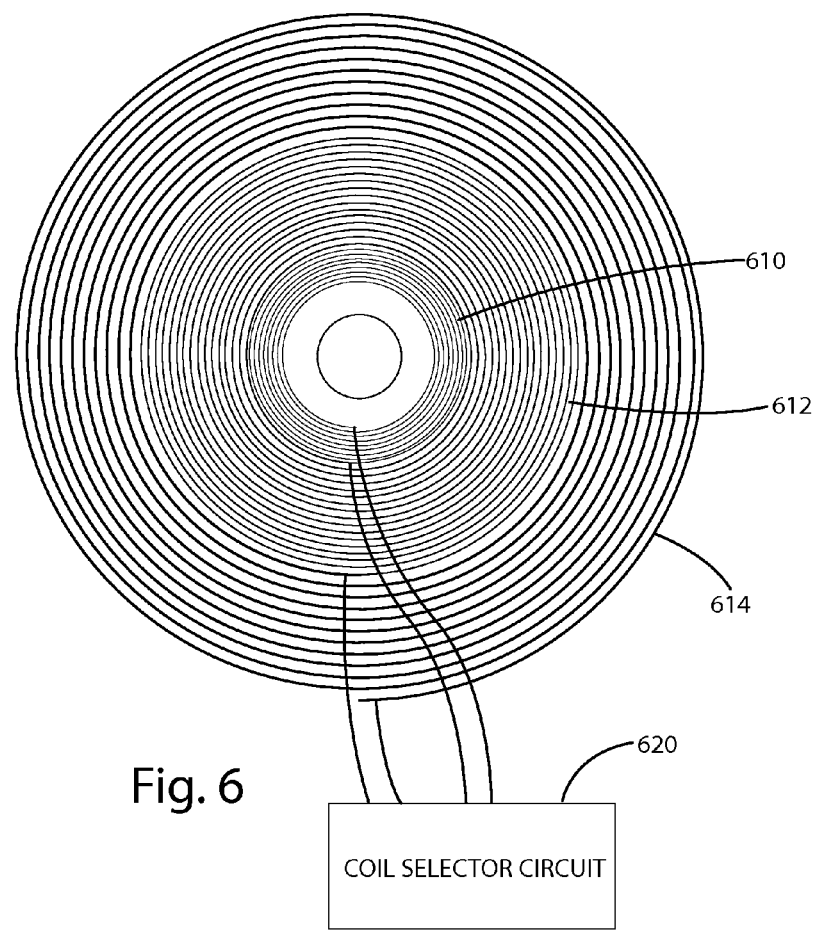
FIG. 6 is a schematic diagram of a tank circuit of one embodiment.
Figure 15:
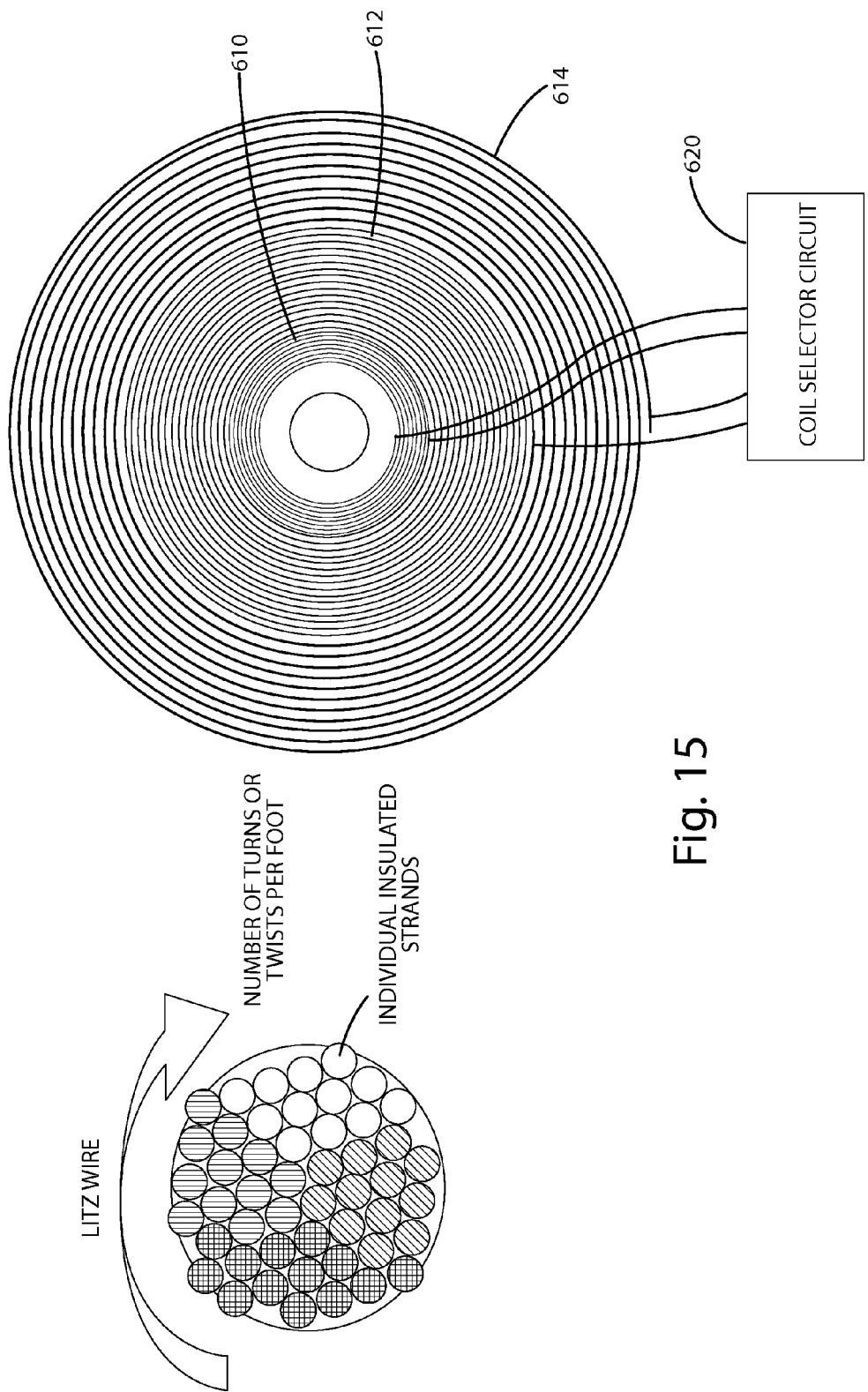
FIG. 15 shows a cross section of litz wire.

The tank circuit 208 of FIG. 2 includes a coil selector circuit 220 and a primary coil assembly 222 with multiple coils. The coil selector circuit 220 is capable of energizing one or more of the multiple coils of the coil assembly 222. FIG. 4 illustrates selecting between multiple separate coils, FIG. 6 illustrates selecting between multiple taps of a single coil, and FIG. 15 illustrates selecting between multiple segments of a single coil. The illustrated embodiments are merely examples, any combinations of separate coils, multiple taps, and multiple segments may be used to provide a variety of different multiple coil configuration options. In one embodiment, the controller 202 instructs the coil selector circuit 220 on which coil to energize. In the illustrated embodiment, the primary coil assembly 222 includes three coils: a low power coil, a medium power coil and a high power coil. In alternative embodiments, the primary coil assembly 222 includes additional or fewer coils. In some applications, the coils of the primary coil assembly 222 may be made of Litz wire. In other embodiments, the coils may be any combination of copper, LITZ, PLITZ, FLITZ, conductive ink or any other materials that have coil properties. The characteristics of each of the coils may vary from application to application and coil to coil. For example, the number of turns, size, length, gauge, shape and configuration of each coil may vary. In one embodiment, the low power coil has approximately 10 strands of LITZ wire, the medium power coil has approximately 50 strands of LITZ wire and the high power coil has approximately 138 strands of LITZ wire. In one embodiment, the sole difference between the low, medium, and high power coils are the respective gauges of the coil. Although described in connection with coils, the primary coil assembly 222 may alternatively be essentially any structure capable of selectively generating multiple ranges of power using electromagnetic fields. In one embodiment, the primary coil assembly 222 may be implemented as multiple printed circuit board coils, such as a printed circuit board coil incorporating the inventive principles of U.S. Ser. No. 60/975,953, which is entitled "Printed Circuit Board Coil" and filed on Sep. 28, 2007 by Baarman et al, and which is incorporated herein by reference in its entirety.

Figure 8:
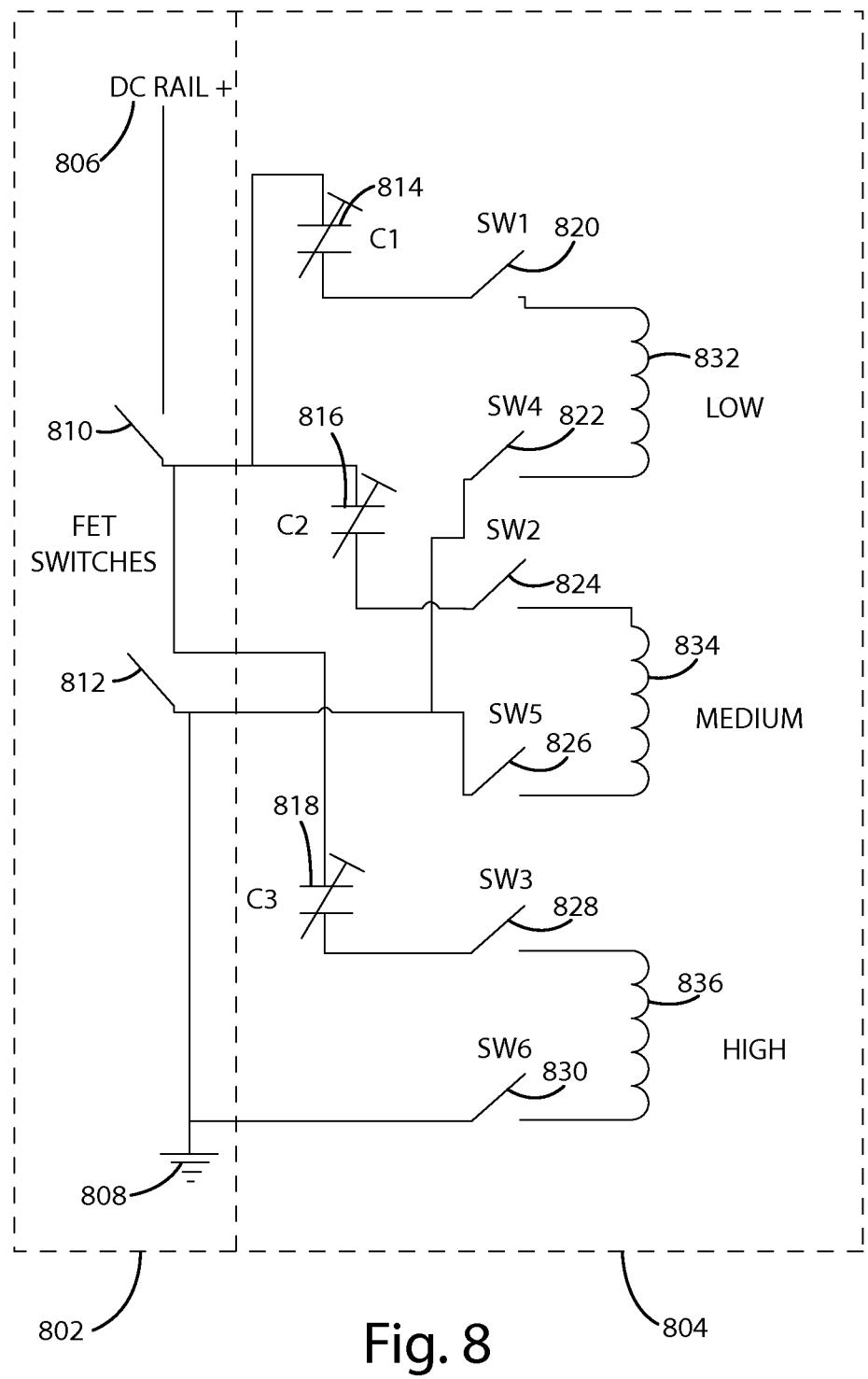
FIG. 8 is a circuit diagram of a switching circuit and tank circuit of one embodiment.

The circuit diagram of FIG. 8 illustrates an exemplary switching circuit 802 and tank circuit 804. The switching circuit includes two field effect transistor switches 810, 812. However, essentially any type of switches may be used. The switches 810, 812 convert DC power to AC power. The AC power is fed in parallel to three switched LC circuits. In the current embodiment, each LC circuit includes a variable capacitor 814, 816, 818 that sets the starting resonance for each coil. In an alternative embodiment, the variable capacitors 814, 816, 818 may be deleted or replaced with non-variable capacitors. The variable capacitors 814, 816, 818 may be controlled my controller 202 during operation or manually at the time of manufacture. In the illustrated embodiment, the primary coil assembly includes a low power coil, 832, a medium power coil 834 and a high power coil 836. However, as previously discussed, different configurations and different numbers of coils may be implemented. Switches 820, 822, 824, 826, 828, 830 control which coil 832, 834, 836 receives power and therefore, which coil or coils are energized. In the current embodiment, the controller 302 activates one pair of switches 820-822, 824-826, 828-830 at a time. That is, the coils are activated in a mutually exclusive fashion. However, in alternative embodiments, multiple coils may be activated simultaneously depending on the application. Further, in other alternative embodiments, additional switches could be placed between each coil for a matrix selection. In another alternative embodiment, switches 822, 826, 830 are deleted or shorted in order to reduce the number of switches in the circuit.

In the current embodiment, the wireless IR receiver 212 and current sensor circuit 210 are both used for communication with remote devices. The current sensor 210 may be used to sense reflected impedance from the remote device, which effectively allows communication over the inductive coupling. The wireless IR receiver may be used to communicate with the wireless IR transmitter 320 in the secondary circuit 300. In an alternative embodiment, a peak detector may replace or be used in conjunction with the communication system already in place. One or both of wireless IR receiver 212 and current sensor circuit 210 may be replaced with a different communication system for communicating with one or more remote devices. For example, any of WIFI, infrared, Bluetooth, cellular or RFID communication systems may be implemented in the primary circuit 200. In one embodiment, the current sensor circuit receives power demand information relating to remote devices with lower power classes and the wireless IR receiver receives power demand information relating to devices with higher power classes. Communicating using the current sensor circuit can be inefficient where a higher amount of power is being transferred. By using a different communication system during higher power transfer, losses can be decreased.

In operation, the primary controller 202, driver circuit 204 and switching circuit 206 apply alternating current to the tank circuit 208 to generate a source of electromagnetic inductive power at a selected power range and frequency.

One embodiment of a tank circuit 208 is illustrated in FIG. 4, and generally designated 400. The tank circuit 208 includes a coil selector circuit 420 and a primary coil assembly 408. The primary coil assembly 408 includes an optional positioning magnet 420, a low power coil 410, a medium power coil 412 and a high power coil 414. In the current embodiment, some of the coils share electrical connections to the coil selector circuit. Specifically, the low power coil 410 shares a lead with the medium power coil 412. The medium power coil 412 shares a different lead with the high power coil 414.

The physical characteristics effect the power that is transferred when the coil is energized. Examples of such characteristics include geometry, length, gauge, and number of turns. Essentially any of the physical characteristic of the coils 414, 412, 410 may vary. In the illustrated embodiment, the low power coil 512 has a relatively short length and gauge compared to the medium power coil 514, which in turn has a shorter length and gauge than the high power coil 514. Further, the coils depicted in FIG. 4 are generally circular. However, the coils may be implemented using other shapes, such as oval, rectangular, square, to list a few. In one embodiment, multidimensional coils are implemented.

Other factors can also effect the power transferred when the coil is energized. For example, one factor is the spacing between the coils 410, 412, 414. In the embodiment illustrated in FIG. 4 there are gaps 416, 418 between the coils 410, 412, 414 that can potentially reduce cross-talk or other interference. In the current embodiment, these gaps 416, 418 are filled with air and serve to provide some isolation between the coils 410, 412, 414. In an alternative embodiment, the gaps 416, 418 may be filled with a shielding material to provide additional isolation. In another alternative embodiment, the gaps 416, 418 may be filled with ferrite in order to direct the magnetic fields produced by coils 410, 412, 414. In the embodiment illustrated in FIG. 6, the spacing between the coils 610, 612, 614 is limited. There are no gaps between the coils, which allows the coils to be more compact while maintaining their size. In the FIG. 6 embodiment, the coils share some leads to the coil selector circuit 620. In alternative embodiments, each coil 610, 612, 614 may include two separate leads to the coil selector circuit 620.

IV. Remote Device

Figure 3:
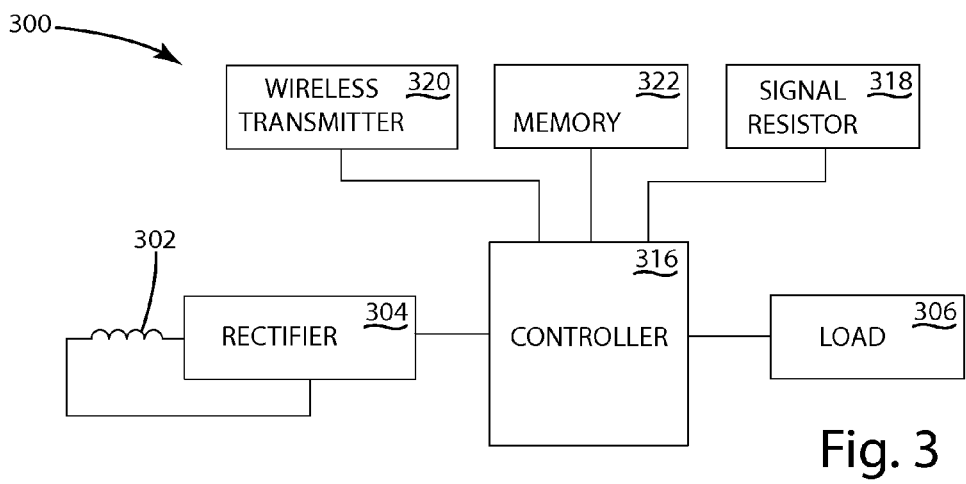
FIG. 3 is a block diagram of a secondary circuit of one embodiment.

One embodiment of a secondary circuit is shown in FIG. 3, and generally designated 300. In the embodiment illustrated in FIG. 3, the secondary circuit 300 generally includes a secondary 302, rectifier 304 (or other components for converting AC power to DC), a secondary controller 316, memory 322, a wireless IR transmitter 320, a signal resistor 318, and a load 306. Other circuitry may be included. For example, in one alternative embodiment a low voltage power supply may be included to scale the received power. In another alternative embodiment, conditioning circuitry may be included to filter or otherwise condition the received power.

The secondary coil 302 of the of the illustrated embodiment is a coil of wire suitable for generating electricity when in the presence of a varying electromagnetic field. Perhaps as shown best in FIG. 5, the secondary coil 509 may correspond in size and shape to one of the primary coils 512, 514, 516. For example, the two coils may have substantially equal diameters. In some applications, the secondary coil 509 may be a coil of Litz wire. As with the primary coils, the characteristics of the secondary coil 509 may vary from application to application. For example, the number of turns, size, shape, configuration or other characteristics of the secondary coil 509 may vary. Further, the characteristics of the wire may vary, such as length, gauge and type of wire. Although described in connection with a coil of wire, the secondary coil 509 may alternatively be essentially any structure capable of generating sufficient electrical power in response to the intended electromagnetic field.

In some alternative embodiments the remote device may have multiple secondary coils. For example, the remote device may have a separate low power coil for low power applications and separate medium and high power coils for medium and high power applications. In another alternative embodiment, the remote device has multiple secondary coils to give the remote device orientation and spatial freedom.

In one embodiment, multiple secondary coils receiving power of different phases can be used to reduce the ripple voltage. This is referenced in Application 60/976,137, entitled "Multiphase Inductive Power Supply System" filed Sep. 9, 2007 to Baarman et al, which is herein incorporated by reference. Multiple coil assemblies each with multiple coils may be desired to transmit power at different phases in such an embodiment.

In operation, the rectifier 304 converts the AC power generated in the secondary coil 302 to DC power. In some applications the rectifier may be deleted. For example, if the load 306 accepts AC power.

The secondary controller 316 may be essentially any type of microcontroller that is capable of operating the communication system to communicate power demand information to the inductive power supply. In some embodiments the secondary controller 316 includes memory. In the illustrated embodiment, the secondary circuit includes external memory 322. The memory generally includes power demand information and may include additional information about the remote device. The power demand information may include a power class that categorizes how much power the remote device desires.

In one embodiment, there are three power classes: the low power class, the medium power class and the high power class. The low power class is defined as devices that desire between 0 and 5 watts of power. The medium power class is defined as devices that desire between 5 and 110 watts of power. The high power class is defined as devices that desire more than 110 watts of power. Examples of devices categorized as low power class devices under this power class scheme include cell phones, MP3 players and personal digital assistants (PDA). Example of devices with a medium power class include laptop computers and other medium power applications. Examples of high power devices include kitchen appliances, such as a blender or frying pan. In alternative embodiments, with different power class schemes the definitions of the power classes may vary.

In one embodiment, signal resistor 318 may be used to send information to the primary controller 202. The use of a signal resistor 318 to provide communication from the secondary circuit 103 to the primary circuit 105 was discussed in U.S. patent application Ser. No. 11/855,710, which was previously incorporated by reference. The signal resistor 318, when shunted, sends a communication signal that signifies an over-current or over-voltage state. When the resistor is shunted, the current or peak detector on the primary circuit 103 is able to sense the over-voltage/over-current condition and act accordingly. The signal resistor 318 of the present invention may be shunted systematically to communicate additional data to the primary controller 202. For example, a stream of data could represent power demand information or provide other information about the remote device. Alternatively, the signal resistor 318 could be replaced with a different communication system entirely. For example, wireless transmitter 320 may be used in conjunction with or in lieu of signal resistor 318 to wirelessly communicate with the wireless receiver 212 of the primary circuit 200. In an alternative embodiment, one or both of wireless IR transmitter 320 and signal resistor 318 may be replaced with a different communication system for communicating with the inductive power supply. For example, any of WIFI, infrared, Bluetooth, cellular or RFID communication systems may be implemented in the remote device 104.

Use of a wireless transmitter or transceiver was previously described in U.S. Patent Application Publication US 2004/0130915A1 to Baarman, which was previously incorporated by reference. Specifically, the use of WIFI, infrared, Bluetooth, cellular or RFID were previously discussed as ways to wirelessly communicate data between a remote device to an inductive power supply. Further, communication using the induction coils and a power line communication protocol was discussed. Any of these methods of transmitting data could be implemented in the present invention in order to transfer the desired data from the remote device to the inductive power supply.

The remote device load 306 may essentially any suitable load. In some embodiments, the load 306 may be a rechargeable battery and the secondary circuit may include additional charging circuitry. In other embodiments the load 306 may relate to the function of the remote device.

V. Method

Figure 9:
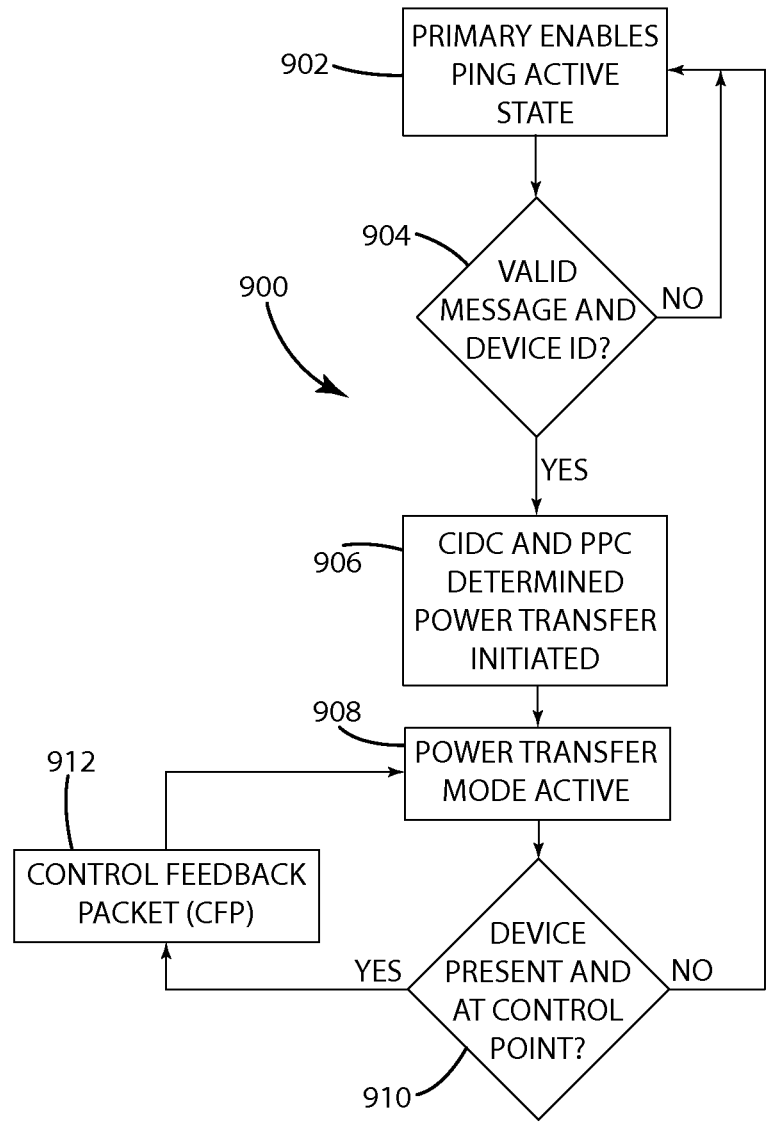
FIG. 9 is a flowchart showing the general steps of a method for powering a remote device.

A method for authentication and power transfer control is illustrated in the flowchart of FIG. 9, and generally designated 900. The method includes periodically transmitting ping messages 902, authenticating any messages received in response 904, in response to an authentic message, determining the control identification class (CIDC) and primary power class (PPC) and initiating power transfer based on the determined CIDC and PPC 906. During active power transfer mode 908, the presence of the device and the status of the control point is continually checked 910 in a feedback loop with control feedback packets from the remote device 912.

In one embodiment, the inductive power supply is in one of several modes: pinging or active power transfer. The ping mode actively determines if a qualified device is present. Power transfer only takes place when a device identification class is recognized and validated.

A safe ping frequency may be determined using the characteristics of the hardware in the inductive power supply system. The primary attempts communication with a secondary by energizing the low power (or other) coil at a specified ping frequency and waits for a response. If a secondary is present within the charging zone, it may be powered sufficiently by the energy sent during the ping operation to initialize itself and send an identification message that may contain power demand information to the inductive power supply.

If the primary fails to detect a device in the charging field during the ping operation, the coil power is removed until the next attempt for detection. If a device is detected during the ping operation, the primary reverts to the established initial operating frequency in an attempt to begin power transfer. The power delivered to the secondary during transfer may be controlled based upon communications received from the secondary.

The control identification classes may identify different control methods for the inductive power supply to use to charge or power the remote device. Examples of control identification classes include charging set point control, charging error control, power supply set point control, power supply error control and power supply direct control.

The primary power class determines the range of power of a specific coil of the inductive power supply. The primary power class also may impact the coil geometry and parametric specifications. In an alternative embodiment, the primary power class includes information about the entire range of power provided by the inductive power supply. The remote device may include a remote device power class in the power demand information transmitted to the inductive power supply. The remote device power class and the primary power class may be one in the same, or they may be different.

In one embodiment, the power class is a portion of the information communicated from the remote device to inductive power supply. In one embodiment information may be provided to the primary circuit about the maximum amount of power the remote device can be expected to require. For example, a cell phone may fall under a 3.5 W maximum power level. Its power class byte would be 0000 0111b.

The following chart describes how a power class byte may be constructed. The power class may be encoded in essentially any manner, this chart merely represents one possible embodiment.

TABLE 1

| Power Class Bits [7:6] | Multiplier | Power Class Bits [5:0] | Power Levels (W) |
|---|---|---|---|
| 00 | 1 | 00000-11111 | 0-32 W, 0.5 W Increments |
| 01 | 10 | 00000-11111 | 0-320 W, 5 W Increments |
| 10 | 100 | 00000-11111 | 0-3200 W, 50.W Increments |
| 11 | 1000 | 00000-11111 | 0-32000 W, 500 W Increments |

Figure 10:
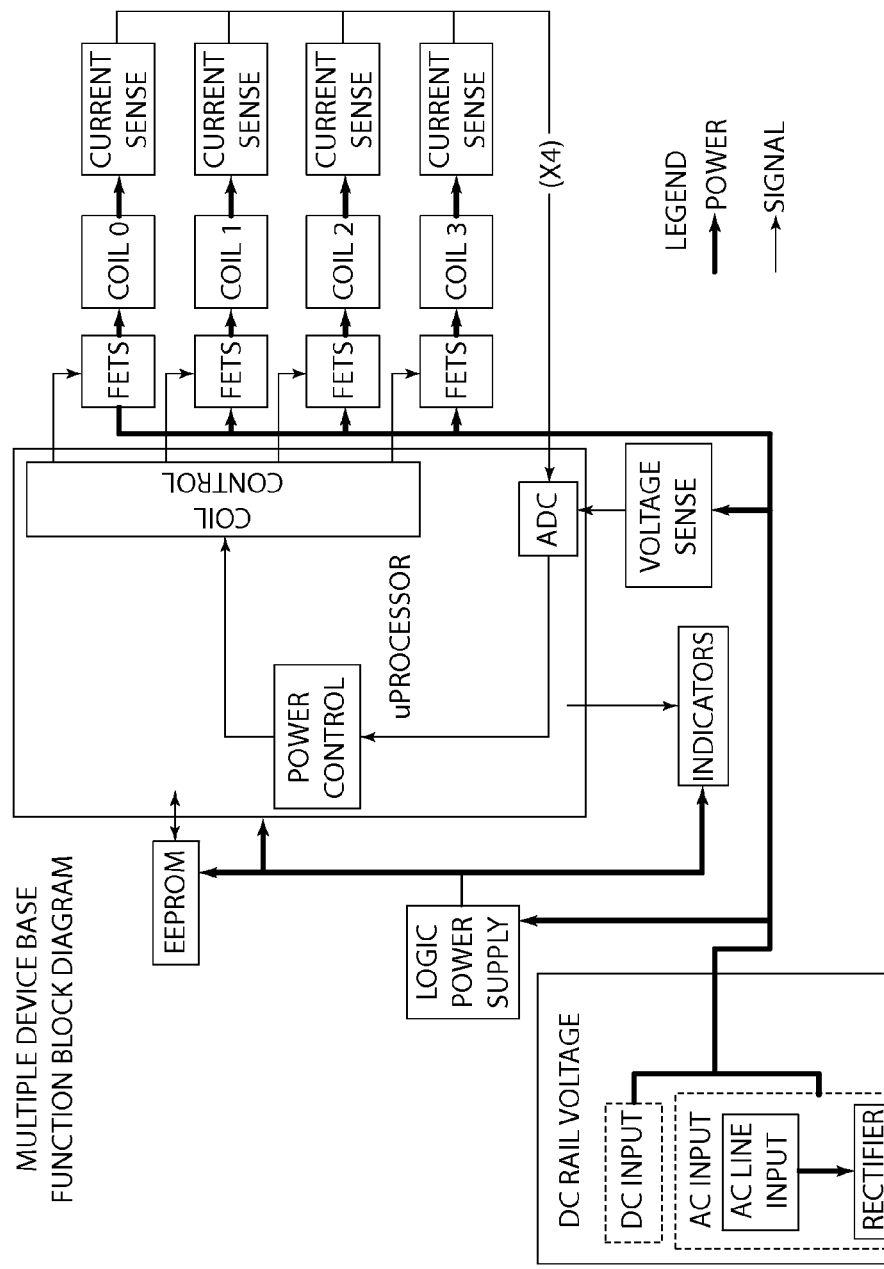
FIG. 10 is a functional block diagram of a primary circuit of one embodiment.
Figure 11:
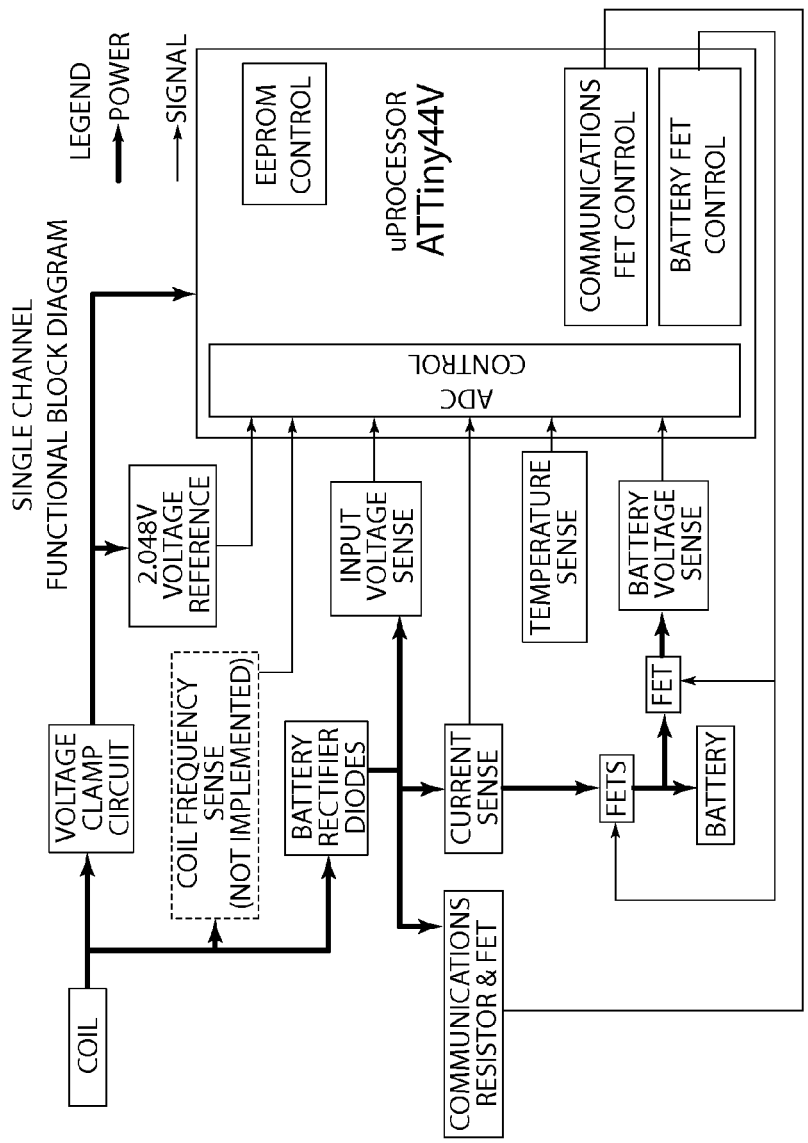
FIG. 11 is a functional block diagram of a secondary circuit of one embodiment.
Figure 12:
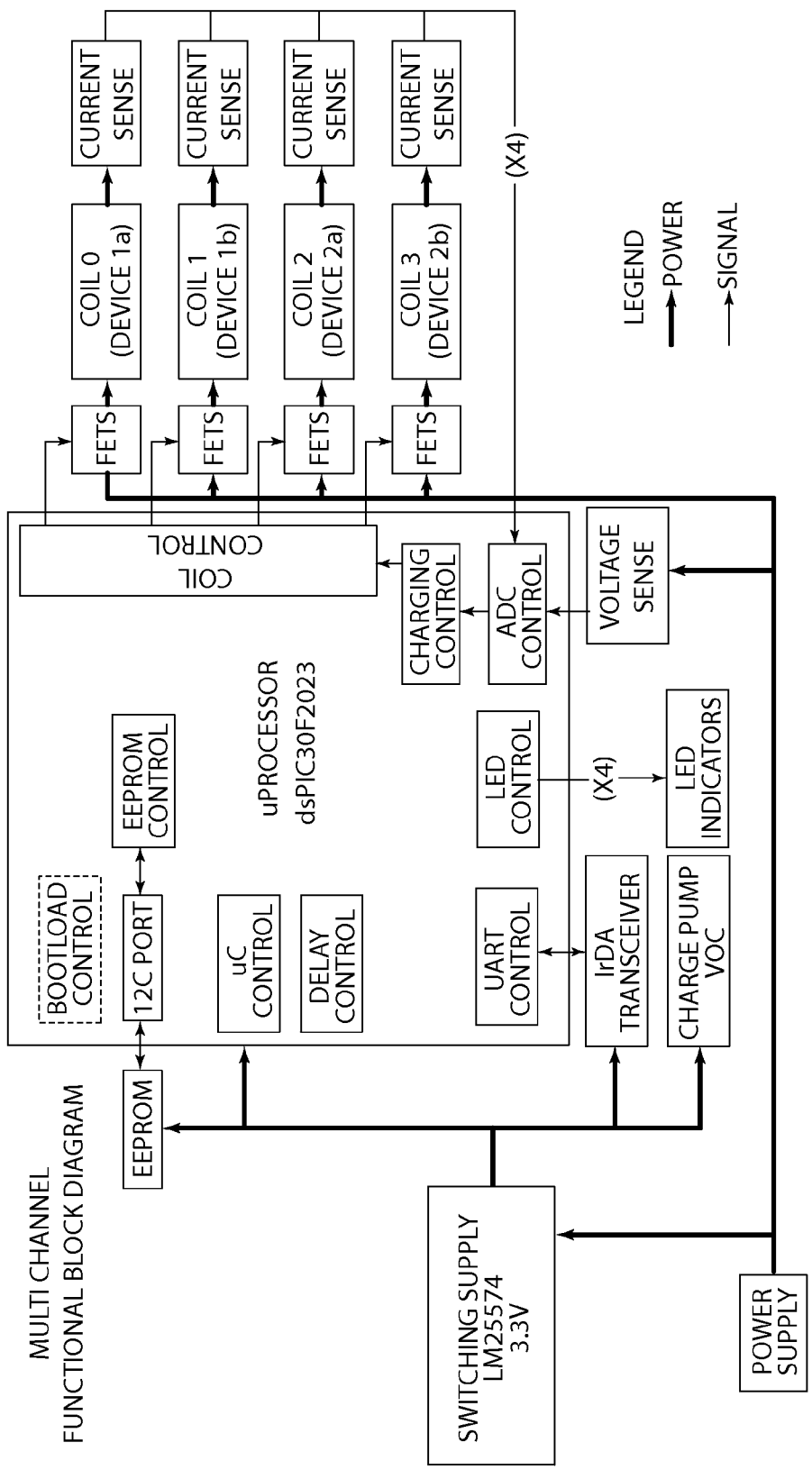
FIG. 12 is a functional block diagram of a primary circuit of one embodiment.
Figure 13:
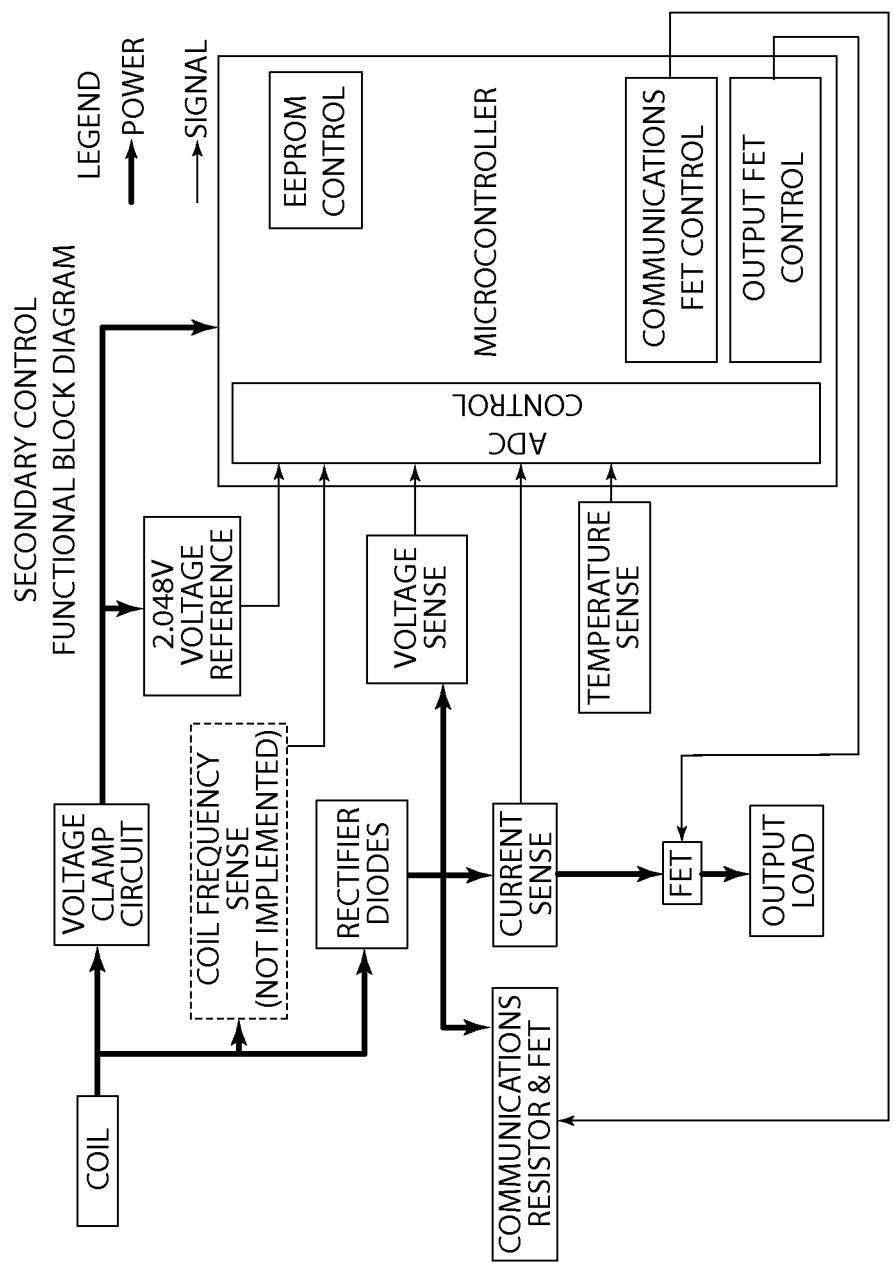
FIG. 13 is a functional block diagram of a secondary circuit of one embodiment.

FIG. 10 illustrates a functional block diagram for providing power in accordance with one embodiment of the present invention. FIG. 11 illustrates a functional block diagram for receiving power in accordance with one embodiment of the present invention. FIG. 12 illustrates a functional block diagram for providing power in accordance with another embodiment of the present invention. FIG. 13 illustrates a functional block diagram for receiving power in accordance with one embodiment of the present invention.

The functional block diagrams of FIGS. 10 and 11 are directed to inductively charging a load in a remote device. The functional block diagrams of FIGS. 12 and 13 are directed to inductively charging a rechargeable battery in a remote device.

In FIG. 10 and FIG. 12, each of the coils may represent a primary coil assembly with multiple coils as described above. Alternatively, each of the coils may represent one coil of a primary coil assembly.

Above, several embodiments of multiple coil inductive power supplies have been described. Specifically, examples have been provided of multiple coil inductive power supplies that use multiple coils configured in a multi-tap configuration and multiple coil inductive power supplies that use a separate coil configuration. Other configurations that provide variable inductance may also be provided. For example, a segmented primary, such as the Litz wire coil shown in FIG. 15, may provide multiple strands that can be connected and energized in various configurations to provide a variable amount of inductance. The various configurations of the segmented primary allow the inductive power supply to better match secondary power and coupling requirements from high power to low power levels using the same primary. In the current embodiment, the combination of taps and segment configurations provides a wide range of inductance values and wire gauges. In some embodiments, some of the segments may be disconnected, allowing an even wider range.

Depending on how the strands are connected, different configurations may be created. The table below describes a number of examples of various coil selection circuit segment options.

TABLE 2

| Initial Turns | Segments | Realized Awg. | Configuration | Realized Turns |
|---|---|---|---|---|
| 10 | 4 | X | 4-Parallel | 10 |
| 10 | 4 | X/2 | 2-Parallel & 2-Series | 20 |
| 10 | 4 | X/4 | 4-Series | 40 |

FIG. 15 shows a cross section of litz wire that has been segmented into four sections. In the illustrated embodiment, each section may be energized individually. In an alternative embodiment, the sections may be divided differently, or each strand may be energized separately. Further, in the current embodiment, the coil selector circuit connects to each segment separately at each tap so that the segments can be arranged in parallel or series depending on how the coil selector circuit connects the various segments together.

Although FIG. 15 illustrates three coils 610, 612, 614 of varying gauges. In an alternative embodiment, each coil may be the same gauge, and the gauge may be controlled by the coil selector circuit choosing which segments or individual strands to energize.

As described above in connection with the other inductive power supply embodiments, the coil selector circuit may be controlled according to a program residing in memory in the controller 202. The coil selector circuit may change the configuration of the segmented primary during operation to adjust based on power demand information provided from the remote device. The ability to dynamically change the gauge of the wire, and other characteristics, is useful to better match the secondary power and coupling requirements.

The above description is that of the current embodiment of the invention. Various alterations and changes can be made without departing from the spirit and broader aspects of the invention.

The embodiments of the invention in which an exclusive property or privilege is claimed are defined as follows:

1. An inductive power supply for supplying wireless power to and receiving communication from a remote device, said inductive power supply comprising:
   a first wireless power transfer primary capable of being energized to transfer power wirelessly to said remote device;
   a second wireless power transfer primary capable of being energized to transfer power wirelessly to said remote device;
   a wireless communication receiver for receiving communication from said remote device via a communication path excluding said first wireless power transfer primary and said second wireless power transfer primary;
   a controller programmed to selectively transfer power wirelessly to said remote device by energizing said first wireless power transfer primary within a first power range or said second wireless power transfer primary within a second power range, said controller programmed to receive communication from said remote device during wireless power transmission within said first power range via said communication path excluding said first wireless power transfer primary and said second wireless power transfer primary,
   said controller programmed to receive communication from said remote device during wireless power transmission within said second power range via a communication path including at least one of said first wireless power transfer primary and said second wireless power transfer primary.

2. The inductive power supply of claim 1 wherein said controller is programmed to selectively transfer power wirelessly to said remote device as a function of said communication from said remote device.

3. The inductive power supply of claim 2 wherein said communication includes power demand information, wherein in response to said power demand information said controller transfers a different amount of power to said remote device and said controller switches between said communication path excluding said first wireless power transfer primary and said second wireless power transfer primary, and said communication path including at least one of said first wireless power transfer primary and said second wireless power transfer primary.

4. The inductive power supply of claim 3 wherein said power demand information includes a remote device ID for looking up power demand information about said remote device in memory.

5. The inductive power supply of claim 2 wherein said controller is programmed to determine an amount of power to be transmitted as a function of said communication received from said remote device, wherein which of said first wireless power transfer primary and said second wireless power transfer primary said controller energizes is a function of said amount of power to be transmitted.

6. The inductive power supply of claim 5 including a memory,
wherein said memory includes a threshold, said controller is programmed to transfer power wirelessly to said remote device by energizing said first primary in response to said amount of power to be transmitted being below said threshold, and said controller is programmed to transfer power wirelessly to said remote device by energizing said second primary in response to said amount of power to be transmitted being above said threshold.

7. The inductive power supply of claim 1 wherein said communication includes a power class of said remote device, wherein said power class of said remote device dictates whether said amount of power transfer is within said first range of power or within said second range of power and whether communication occurs via communication path excluding said first wireless power transfer primary and said second wireless power transfer primary or said communication path including at least one of said first wireless power transfer primary and said second wireless power transfer primary.

8. The inductive power supply of claim 1 wherein said selectively transferring said amount of power wirelessly to said remote device includes energizing multiple of said plurality of primaries as wireless power transfer primaries.

9. A method for supplying wireless power to and receiving communication from a remote device, said method comprising:
providing a plurality of primaries, each capable of being energized to transfer power wirelessly to the remote device;
determining an amount of power to supply to said remote device;
selectively transferring said amount of power wirelessly to said remote device by energizing at least one of said plurality of primaries as a wireless power transfer primary; and
depending on said amount of power being transferred to said remote device, selectively communicating with said remote device via wireless power transfer primary during transfer of power within a first power range or communicating with said remote device via one of said plurality of primaries other than said wireless power transfer primary during transfer of power within a second power range.

10. The method for supplying wireless power of claim 9 including selectively transferring power wirelessly to said remote device as a function of said communication from said remote device.

11. The method for supplying wireless power of claim 10 wherein said communication includes power demand information, wherein in response to said power demand information transferring a different amount of power to said remote device and communicating with said remote device via a different communication path.

12. The method for supplying wireless power of claim 11 wherein said power demand information includes a remote device ID and said method includes looking up power demand information about said remote device in memory based on said remote device ID.

13. The method for supplying wireless power of claim 10 including determining an amount of power to be transmitted as a function of said communication received from said remote device, wherein certain of said one or more of said primaries are selected for selectively transferring said amount of power wireless to said remote device based on said amount of power.

14. The inductive power supply of claim 9 wherein said communication includes a power class of said remote device, wherein said power class of said remote device dictates whether said amount of power transfer is within a first range of power or within a second range of power and whether communication occurs via a communication path excluding said wireless power transfer primary or a communication path including said wireless power transfer primary.

15. The method for supplying wireless power of claim 9 wherein said controller is programmed to selectively transfer power wirelessly to said remote device by energizing both said first wireless power transfer primary and said second wireless power transfer primary within said first power range, said second power range, or a third power range.

16. An inductive power supply for supplying wireless power to and receiving communication from a remote device, said inductive power supply comprising:
a controller;
a wireless power transfer primary capable of being energized to transfer an amount of power wirelessly to said remote device;
a first communication path between said remote device and said controller, said first communication path including said wireless power transfer primary;
a second communication path between said remote device and said controller, said second communication path excluding said wireless power transfer primary and including at least one of WIFI, infrared, Bluetooth, cellular, and RFID;
wherein said controller is programmed to selectively communicate with said remote device via said first communication path or said second communication path depending on said amount of power wirelessly transferred to said remote device.

17. The inductive power supply of claim 16 wherein said controller is programmed to selectively transfer power wirelesly to said remote device as a function of communication from said remote device.

18. The inductive power supply of claim 17 wherein said communication includes power demand information, wherein in response to said power demand information said controller transfers a different amount of power to said remote device via said wireless power transfer primary and said controller switches between said first communication path and said second communication path.

19. The inductive power supply of claim 18 wherein said power demand information includes a remote device ID for looking up power demand information about said remote device in memory.

20. The inductive power supply of claim 17 wherein said controller is programmed to determine said amount of power to be transmitted as a function of said communication received from said remote device.

21. The inductive power supply of claim 16 wherein said communication includes a power class of said remote device, wherein said power class of said remote device dictates whether said amount of power transfer is within a first range of power or within a second range of power and whether communication occurs via said first communication path or said second communication path.

* * * * *

UNITED STATES PATENT AND TRADEMARK OFFICE
CERTIFICATE OF CORRECTION

PATENT NO.      : 8,653,698 B2
APPLICATION NO. : 13/680427
DATED           : February 18, 2014
INVENTOR(S)     : David W. Baarman et al.

It is certified that error appears in the above-identified patent and that said Letters Patent is hereby corrected as shown below:

On the title page, item "72" should read item -- 75 --

On the title page, item (71) Applicants:

"(71) Applicants:
David W. Baarman, Fennville, MI (US)
Scott A. Mollema, Rockford, MI (US)
Joshua K. Schwannecke, Grand Rapids, MI (US)"

should be

-(73) Assignee:
Access Business Group International LLC, Ada, MI (US)-

In the claims

Column 14, claim 17, line 63-64:

"controller is programmed to selectively transfer power wire-les sly to said remote device as a function of communications"

should be

-- controller is programmed to selectively transfer power wire-lessly to said remote device as a function of communications --

Signed and Sealed this
Twenty-second Day of July, 2014

Michelle K. Lee
*Deputy Director of the United States Patent and Trademark Office*